(12) United States Patent
Shin et al.

(10) Patent No.: US 7,471,898 B2
(45) Date of Patent: Dec. 30, 2008

(54) DEVICE AND METHOD FOR OPTICAL SUPERVISORY CHANNEL FRAMING IN OPTICAL TRANSPORT NETWORK SYSTEM

(75) Inventors: Jong-Yoon Shin, Youngin (KR); Ji-Sung Jung, Daejeon (KR); Yool Kwon, Busan (KR); Je-Soo Ko, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 890 days.

(21) Appl. No.: 10/836,185

(22) Filed: Apr. 29, 2004

(65) Prior Publication Data
US 2005/0063700 A1 Mar. 24, 2005

(30) Foreign Application Priority Data
Sep. 2, 2003 (KR) .................. 10-2003-0061065

(51) Int. Cl.
*H04B 10/08* (2006.01)
(52) U.S. Cl. .................. 398/30; 398/31; 398/33; 398/34; 370/242; 370/247; 370/252
(58) Field of Classification Search .......... 398/6–8, 398/25–34, 45–57, 79, 93–95, 173–181; 370/299, 373
See application file for complete search history.

(56) References Cited

U.S. PATENT DOCUMENTS

| | | | |
|---|---|---|---|
| 5,500,756 A * | 3/1996 | Tsushima et al. | 398/181 |
| 6,292,289 B1 | 9/2001 | Sugaya et al. | |
| 6,356,368 B1 | 3/2002 | Arao | |
| 6,594,047 B1 * | 7/2003 | Ballintine et al. | 398/79 |
| 7,076,165 B2 * | 7/2006 | Myoung et al. | 398/33 |
| 7,190,896 B1 * | 3/2007 | Wang et al. | 398/30 |

(Continued)

FOREIGN PATENT DOCUMENTS

KR 1020000033147 A 6/2000

(Continued)

OTHER PUBLICATIONS

Bendelli et al: "OMS protection scheme implementation in the PEGASO OTN testbed", OFC 2000, Mar. 7-10, 2000, vol. 4, pp. 81-83.*

(Continued)

*Primary Examiner*—Kenneth N Vanderpuye
*Assistant Examiner*—Li Liu
(74) *Attorney, Agent, or Firm*—Blakely, Sokoloff, Taylor & Zafman (57) ABSTRACT

Disclosed is a device and method for optical supervisory channel framing in an optical transport network system including at least one of an optical transmission section, an optical multiplex section, and an optical channel section. A maintenance signal is generated according to a first LOS (Loss OF Signal) signal generated from at least one of the optical transmission section, the optical multiplex section, and the optical channel section. The maintenance signal and a frame-related channel such as a message communication channel are multiplexed to generate an optical supervisory channel frame. The optical supervisory channel frame is output to another device including a repeater and a terminal system through a single supervisory channel.

7 Claims, 9 Drawing Sheets

U.S. PATENT DOCUMENTS

2003/0035171 A1*  2/2003  Touma ..................... 359/124
2004/0156325 A1*  8/2004  Perkins et al. ............. 370/299
2004/0208552 A1* 10/2004  Harney et al. ............... 398/51

FOREIGN PATENT DOCUMENTS

KR     1020030056289 A     7/2003

OTHER PUBLICATIONS

Maeda: "Management and Control of Transparent Optical Networks", IEEE Journal of Slected Areas in Communications, vol. 16, No. 7, Sep. 1998, pp. 1008-1023.*

J.Y. Shin et al., "Implementation of optical supervisory channel subsystem carrying OTM overheads in 1.6T WDM transmission system", Abstract, Photoonics Conference, pp. 533-534, 2002.

* cited by examiner

| OTS-P | PMI | BDI | APR | RES |
|---|---|---|---|---|
| OMS-P | FDI | PMI | BDI | RES |
| OCh-P | OCI | FDI | RES | |

PMI: Payload missing indication  
APR: Automatic power reduction  
FDI: Forward defect indication  
BDI: Backward defect indication  
RES: Reserved  
OCI: Open connection indication

FIG.9

DEVICE AND METHOD FOR OPTICAL SUPERVISORY CHANNEL FRAMING IN OPTICAL TRANSPORT NETWORK SYSTEM

CROSS REFERENCE TO RELATED APPLICATION

This application claims priority to and the benefit of Korea Patent Application No. 2003-61065 filed on Sep. 2, 2003 in the Korean Intellectual Property Office, the content of which is incorporated herein by reference.

BACKGROUND OF THE INVENTION (a) Field of the Invention

The present invention relates to a device and method for optical supervisory channel framing in an optical transport network system. More specifically, the present invention relates to a device and method for optical supervisory channel framing in a multi-channel wavelength division multiplexing system.

(b) Description of the Related Art

Recently, the ITU-T (International Telecommunication Union-Telecommunication Standardization Sector) has been developing standardization in regard to the supervisory channel operation for optical signal maintenance by sections in the optical transport network environment.

The optical supervisory channel in the optical transport network system transports optical transport module overhead signals, which are overhead signals of an optical transmission section, an optical multiplex section, and an optical channel optical channel section.

The optical supervisory channel also transports a signaling communication channel for the control plane of the optical transport network, a message communication channel, a protection communication channel, and an automatic laser power control channel.

Figure 1:
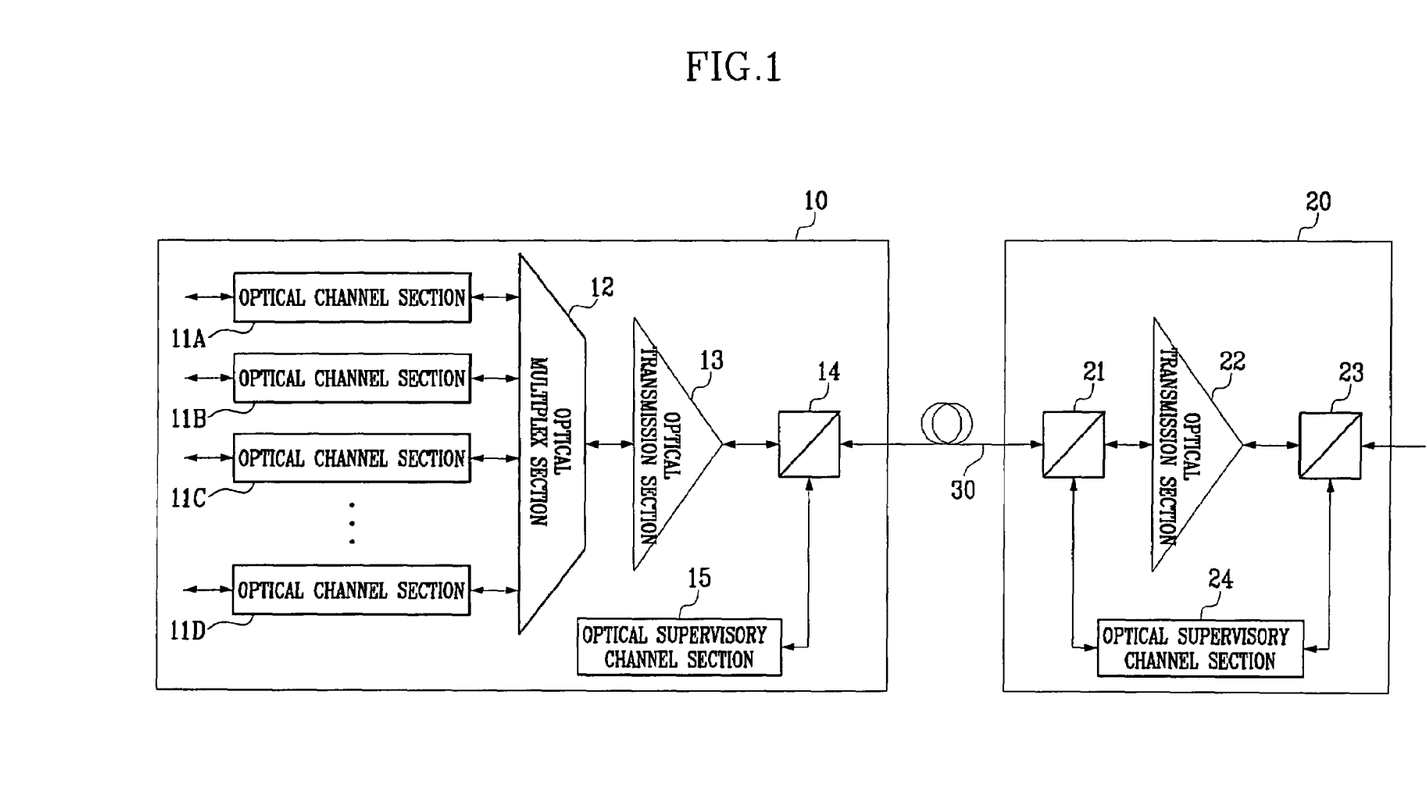
FIG. 1 is a schematic showing the configuration of a general optical transport network system.

FIG. 1 is a schematic of a general optical transport network system, in which the configuration of a wavelength division multiplexing system is illustrated.

The conventional optical transport network system comprises, as shown in FIG. 1, a terminal WDM (Wavelength Division Multiplexing) system 10 and a repeater 20, which are connected to each other through an optical line 30.

More specifically, the terminal WDM system 10 comprises an optical channel section 11, an optical multiplex section 12, an optical transmission section 13, a first WDM coupler 14, and an optical supervisory channel section 15. The repeater 20 comprises a second WDM coupler 21, an optical transmission section 22, a third WDM coupler 23, and an optical supervisory channel section 24.

The operation of the optical transport network system as constructed above is described as follows. First, the optical transmission section 13 amplifies a multiplexed optical signal from the optical multiplex section 12 to a predetermined level, and the first WDM coupler 14 couples the amplified optical signal received from the optical transmission section 13 to an optical supervisory channel signal from the optical supervisory channel section 15, and transmits the coupled signals to the repeater 20.

In the repeater 20, the second WDM coupler 23 divides the received optical signals into a main optical signal and an optical supervisory control signal. The optical transmission section 22 amplifies the main optical signal to a predetermined level, and the optical supervisory channel section 24 receives the optical supervisory channel signal.

Subsequently, the third WDM coupler 23 couples the amplified optical signal to the optical supervisory channel signal and transmits the coupled signals to another repeater or another WDM system in the optical transport network system.

However, the conventional optical transport network system of the above configuration and operation separately operates optical supervisory channels transporting the section-specific overhead signals, which can cause some problems in regard to the dissipation of resources and the deterioration of efficiency in transporting a single optical transport module overhead signal to the respective sections.

In addition, the conventional optical transport network system simply suggests a method of inserting or extracting optical supervisory channels to or from an optical line, but never takes into consideration how to effectively transport maintenance signals received from the respective sections (e.g., the optical channel section, the optical multiplex section, and the optical transmission section) by the optical supervisory channel device in the optical transport network system, or how to extract maintenance signals from the received optical supervisory channel frame and to transport them to the respective sections.

Namely, the conventional optical transport network system receives overhead signals for maintenance of the section-specific optical signals from the central CPU and transports them to each section-specific CPU. Hence, the maintenance signals for the main optical signal are transferred to each section-specific CPU after a predetermined time has elapsed, resulting in the waste of a great deal of time and resources in controlling the optical transport network plane using the maintenance signals.

In addition, the conventional optical transport network system cannot multiplex the overhead signals received from the respective sections and the optical supervisory channel overhead signal from the optical supervisory channel device in the system into a single multiplexed signal. Hence, the conventional optical transport network system must transfer the respective overhead signals through the section-specific optical supervisory channels so as to transfer the optical transport module overhead signals to another repeater or another terminal WDM system.

SUMMARY OF THE INVENTION

The present invention is directed to a device and method for optical supervisory channel framing in an optical transport network system that generates signals for preventing an occurrence of problems including a loss of signal (LOS) in the respective sections (optical transmission section/optical multiplex section/optical channel section) and rapidly transfers them to the respective sections.

The present invention is also directed to a device and method for optical supervisory channel framing in an optical transport network system that transfers optical supervisory channel frames, generated by multiplexing the section-specific maintenance signals and the related channels, to another device (another repeater, or another terminal system) through a single optical supervisory channel (1510 nm or 1640 nm).

In one aspect of the present invention, there is provided a device for optical supervisory channel framing in an optical transport network system, which includes at least one of an optical transmission section, an optical multiplex section, and an optical channel section, the device including: a maintenance signal generator for generating a maintenance signal according to an LOS (Loss Of Signal) signal generated from the at least one section, and generating an LOS prevention signal for preventing an occurrence of another problem after a first problem by sections according to the LOS signal and an optical supervisory channel frame including an externally received maintenance signal; a maintenance transceiver for transferring the LOS prevention signal to the at least one section, or the LOS signal to the maintenance signal generator; and a central controller for multiplexing the maintenance signal and a frame-related channel including a message communication channel to generate an optical supervisory channel frame, and transmitting the. generated optical supervisory channel frame to another device including a repeater and a terminal system through a single optical supervisory channel.

The device further includes: an optical transceiver for converting the externally received optical supervisory channel frame to an electrical signal; and an optical supervisory channel framing supervisor/controller for analyzing the electrical signal to detect an occurrence of a problem including a line fault, and generating an LOS signal upon the detection of a problem.

In another aspect of the present invention, there is provided a method for optical supervisory channel framing in an optical transport network system, which includes at least one of an optical transmission section, an optical multiplex section, and an optical channel section, the method including: (a) generating a maintenance signal according to an LOS signal generated from the at least one section; (b) generating an LOS prevention signal for preventing an occurrence of another problem after a first problem by sections according to the LOS signal and an optical supervisory channel frame including an externally received maintenance signal; (c) transferring the LOS prevention signal to any one section; (d) multiplexing the maintenance signal and a frame-related channel including a message communication channel to generate an optical supervisory channel frame; and (e) transmitting the generated optical supervisory channel frame to another device including a repeater and a terminal system through a single optical supervisory channel.

The method further includes: (f) analyzing the externally received optical supervisory channel frame to detect an occurrence of a problem including a line fault, and generating an LOS signal upon the detection of a problem; and (g) extracting an overhead of the externally received optical supervisory channel frame, and inserting the extracted overhead in the optical supervisory channel frame.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 2:
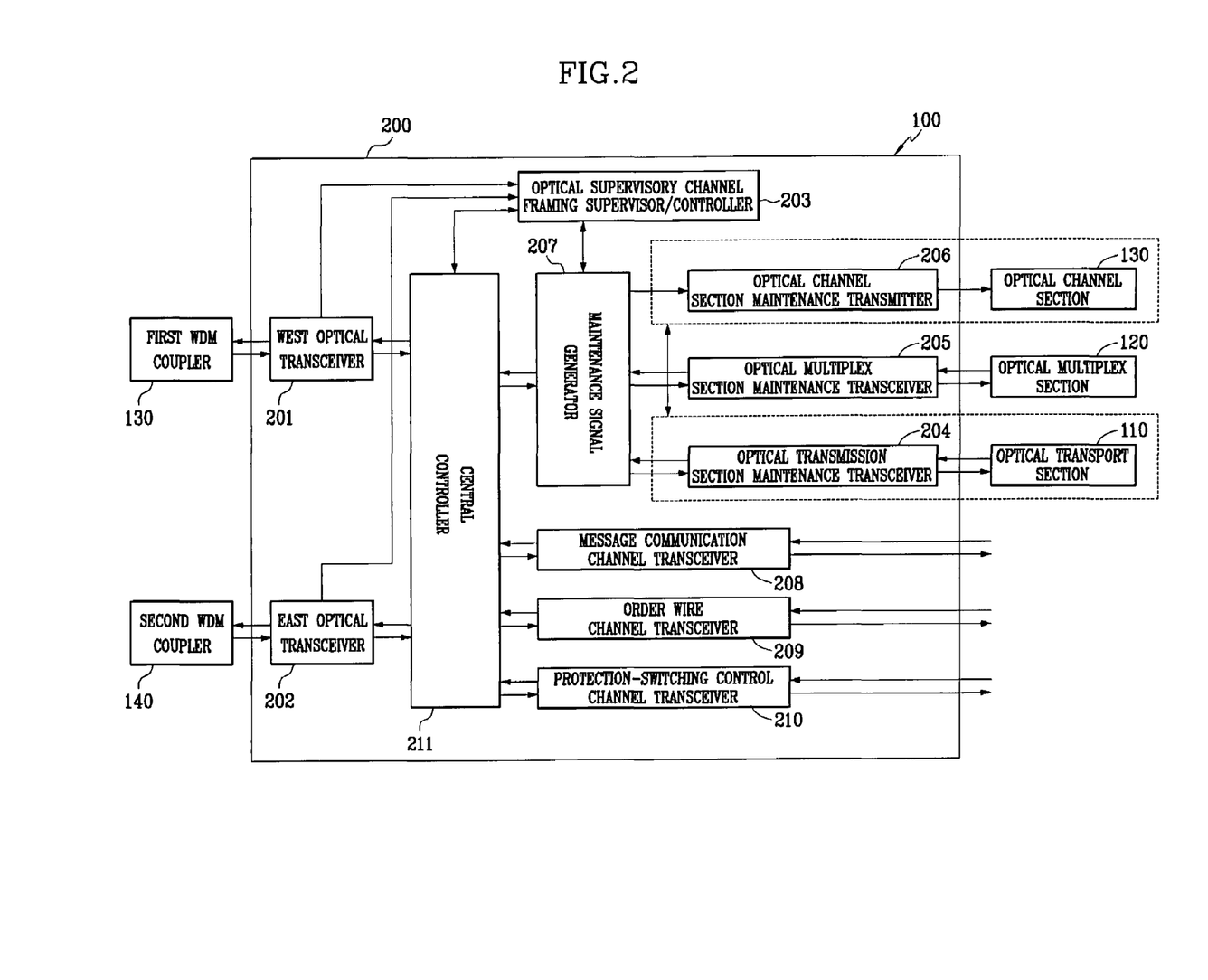
FIG. 2 is a detailed diagram of an optical supervisory channel framing device in an optical transport network system according to an embodiment of the present invention.

FIG. 2 is a detailed diagram of an optical supervisory channel framing device 200 in an optical transport network system 100 according to an embodiment of the present invention.

The optical supervisory channel framing device 200 in the optical transport network system 100 comprises, as shown in FIG. 2, a west optical transceiver 201, an east optical transceiver 202, an optical supervisory channel framing supervisor/controller 203, an optical transmission section maintenance transceiver 204, an optical multiplex section maintenance transceiver 205, an optical channel section maintenance transmitter 206, a maintenance signal generator 207, a message communication channel transceiver 208, an order wire channel transceiver 209, a protection-switching control channel transceiver 210, and a central controller 211.

More specifically, the west optical transceiver 201 converts an optical signal received from a first WDM coupler 130 of the optical transport network system 100 to an electrical signal, or outputs an optical supervisory channel frame according to an embodiment of the present invention to the first WDM coupler 130.

The east optical transceiver 202 also converts an optical signal received from a second WDM coupler 140 to an electrical signal, or outputs the optical supervisory channel frame according to the embodiment of the present invention to the second WDM coupler 140.

The optical signals from the first and second WDM couplers 130 and 140 are maintenance signals, which are called the optical supervisory channel frames, as received from another optical supervisory channel framing device in the optical transport network system 100. Namely, the optical signals are signals generated based on the LOS (Loss Of Signal) signals first produced from the respective sections (optical transmission section/optical multiplex section/optical channel section) to remove the problems occurring in a specific section.

The optical supervisory channel framing supervisor/controller 203 analyzes the electrical signals (which are called the optical supervisory channel frames) received from the west and east optical transceivers 201 and 202 to detect the occurrence of a problem (e.g., line fault, power off, etc.) and, in the presence of a problem, it outputs an LOS signal.

The optical supervisory channel framing supervisor/controller 203 also detects the optical supervisory channel frame from the received optical signals, and, with a failure to detect the optical supervisory channel frame, outputs an LOF (Loss Of Frame) signal. Otherwise, upon detecting the optical supervisory channel frame, the optical supervisory channel framing supervisor/controller 203 extracts the overhead of the optical supervisory channel frame (refer to Table 1) or generates the overhead of the optical supervisory channel frame, and transmits the extracted/generated overhead to the central controller 211.

The optical transmission section maintenance transceiver 204 receives the LOS signal from an optical transmission section 110 of the optical transport network system 100, transmits the received LOS signal to the maintenance signal generator 207, and transfers an LOS prevention signal (a signal for preventing an occurrence of another LOS after a first LOS) from the maintenance signal generator 207 to the optical transmission section 110.

The optical multiplex section maintenance transceiver 205 receives the LOS signal from the optical multiplex section 120 of the optical transport network system 100, transmits the received LOS signal to the maintenance signal generator 207, and transfers the LOS prevention signal from the maintenance signal generator 207 to the optical multiplex section 120.

The optical channel section maintenance transmitter 206 transfers the LOS prevention signal from the maintenance signal generator 207 to an optical channel section 130. In this way, the optical channel section maintenance transmitter 206 detects the occurrence and cause of a problem in the optical channel section 130 from the optical transport module overhead signals of the optical supervisory channel frames received from the first and second WDM couplers 130 and 140, and hence does not separately receive the LOS signal from the optical channel section 130, thereby efficiently reducing the amount of signal communication.

The maintenance signal generator 207 generates section-specific maintenance signals OTS-P, OMS-P, and OCh-P (refer to FIG. 6) according to the LOS signals received from the optical transmission section maintenance transceiver transceiver 204, and the optical multiplex section maintenance transceiver 205, and outputs the generated maintenance signals to the central controller 211.

The maintenance signal generator 207 also generates the LOS prevention signal, that is, the signal for preventing an occurrence of another LOS after a first LOS, using the maintenance signals received from the central controller 211 (i.e., the maintenance signals received from another optical supervisory channel framing device) and the section-specific LOS signals from the respective transceivers 204 and 205.

Subsequently, the maintenance signal generator 207 generates an optical supervisory channel LOS prevention signal according to the maintenance signals OTS-O, OMS-O, and OCh-O (refer to FIG. 8) received from the central controller 211 and supplies them to the optical supervisory channel framing supervisor/controller 203. The optical supervisory channel framing supervisor/controller 203 uses the LOS prevention signal to prevent possible problems occurring in the optical transceivers 201 and 202.

The maintenance signal generator 207 also uses the section-specified maintenance transceivers 204, 205, and 206 so as to rapidly transmit the generated LOS prevention signal to the respective functional sections 110, 120, and 130.

The message communication channel transceiver 208 communicates message communication channels for TMN (Telecommunication Message Network) message communication with signaling channels for the control plane of the optical transport network.

The protection-switching control channel transceiver 210 provides channels for band-specific optical multiplex section protection switching.

The order wire channel transceiver 209 communicates order wire channels for voice message communication with the optical transport network system 100.

The central controller 211 demultiplexes the optical supervisory channel frames (including the maintenance signals) received from the west and east optical transceivers 201 and 202, and transmits the demultiplexed optical supervisory channel frames to the maintenance signal generator 207.

Figure 4:
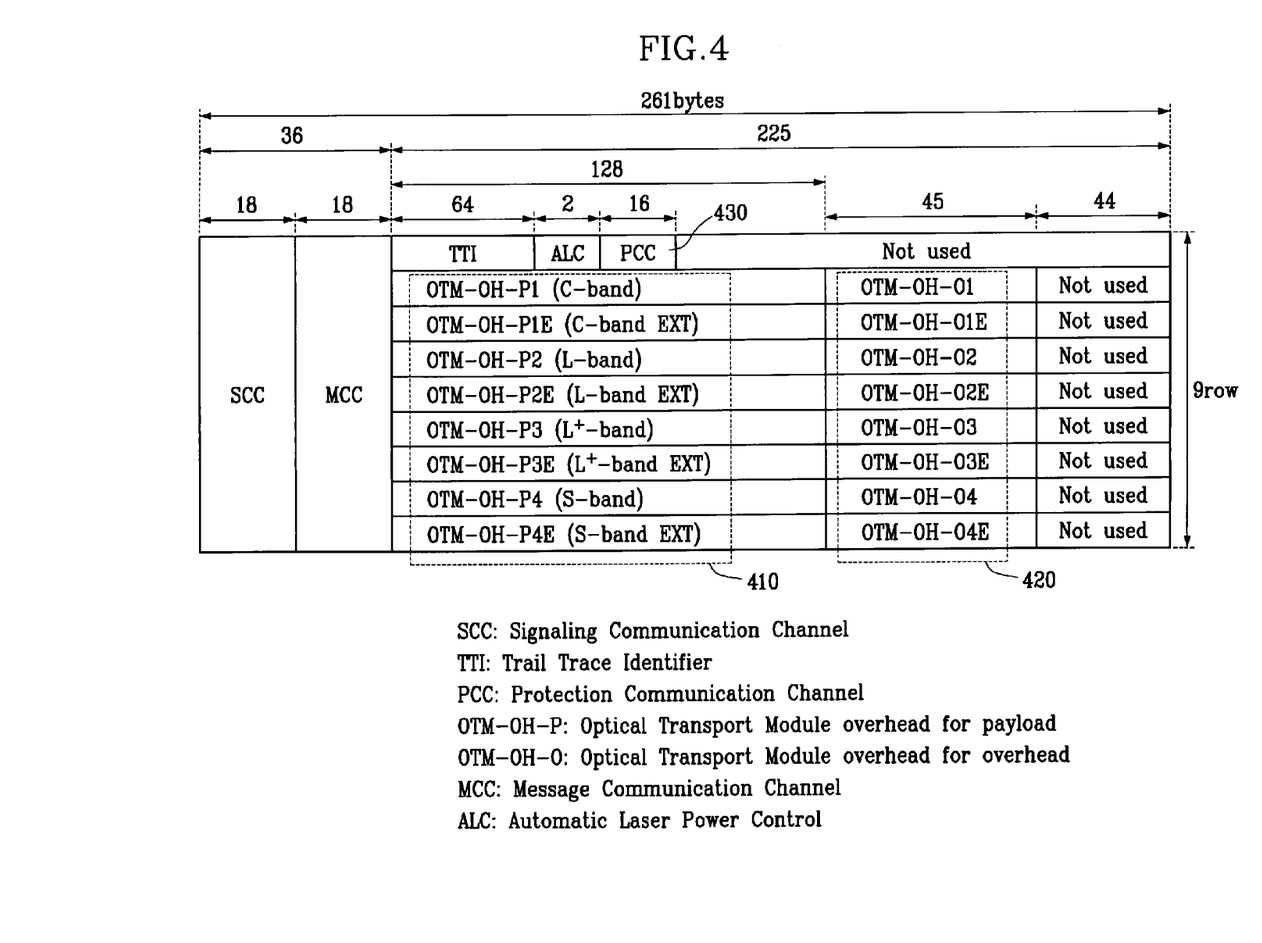
FIG. 4 is a diagram of the configuration of the payload frame (optical transport module overhead signal) shown in FIG. 3.

The central controller 211 also multiplexes the section-specific overhead signals for payload and overhead OTM-OH-P and OTM-OH-O received from the maintenance signal generator 207 and the channels received from the channel transceivers 208, 209, and 210 to generate an optical transport module overhead signal OTM-OH (refer to FIG. 4).

Then the central controller 211 multiplexes the generated optical transport module overhead signal OTM-OH together with the overhead (refer to Table 1) of the optical supervisory channel frame received from the optical supervisory channel framing supervisor/controller 203 to generate an optical supervisory channel frame.

The central controller 211 transfers the generated optical supervisory channel frame to another optical supervisory channel framing device in the optical transport network system 100 through a single optical supervisory channel (1510 nm or 1640 nm in the embodiment of the present invention).

In this manner, the optical supervisory channel framing device according to the embodiment of the present invention processes all the LOS signals generated from an occurrence of the section-specific (optical channel section/optical multiplex section/optical transmission section) problem by the signal maintenance signal generator 207, and rapidly transfers the LOS prevention signals for preventing an occurrence of another problem after the first problem to the respective sections 110, 120, and 130 through the section-specific maintenance transceivers 204, 205, and 206.

Namely, the maintenance signal generator 207 rapidly transfers only the section-specific LOS prevention signals to the respective functional sections 110, 120, and 130 through the section-specific maintenance transceivers 204, 205, and 206, instead of transferring the section-specific LOS prevention signals and maintenance signals OTS-P, OMS-P, and OCh-P to the respective functional sections through the section-specific maintenance transceivers in a simultaneous manner.

The section-specific maintenance signals OTS-P, OMS-P, and OCh-P are transferred to the respective functional sections 110, 120, and 130 via a central CPU (not shown) in the optical transport network system 100. This simplifies the connection between the optical supervisory channel framing device and each functional section to make the system configuration simply realized.

In addition, the optical supervisory channel framing device transfers the optical supervisory channel frames generated by multiplexing the section-specific maintenance signals and the related channels to other devices (e.g., the repeater, the terminal system, the optical cross connection system, etc.) through a single optical supervisory channel (1510 nm or 1640 nm in the embodiment of the present invention), so as to reduce the dissipation of separate hardware equipment and resources.

The configuration of the optical supervisory channel frame according to an embodiment of the present invention is described below with reference to the accompanying drawing.

Figure 3:
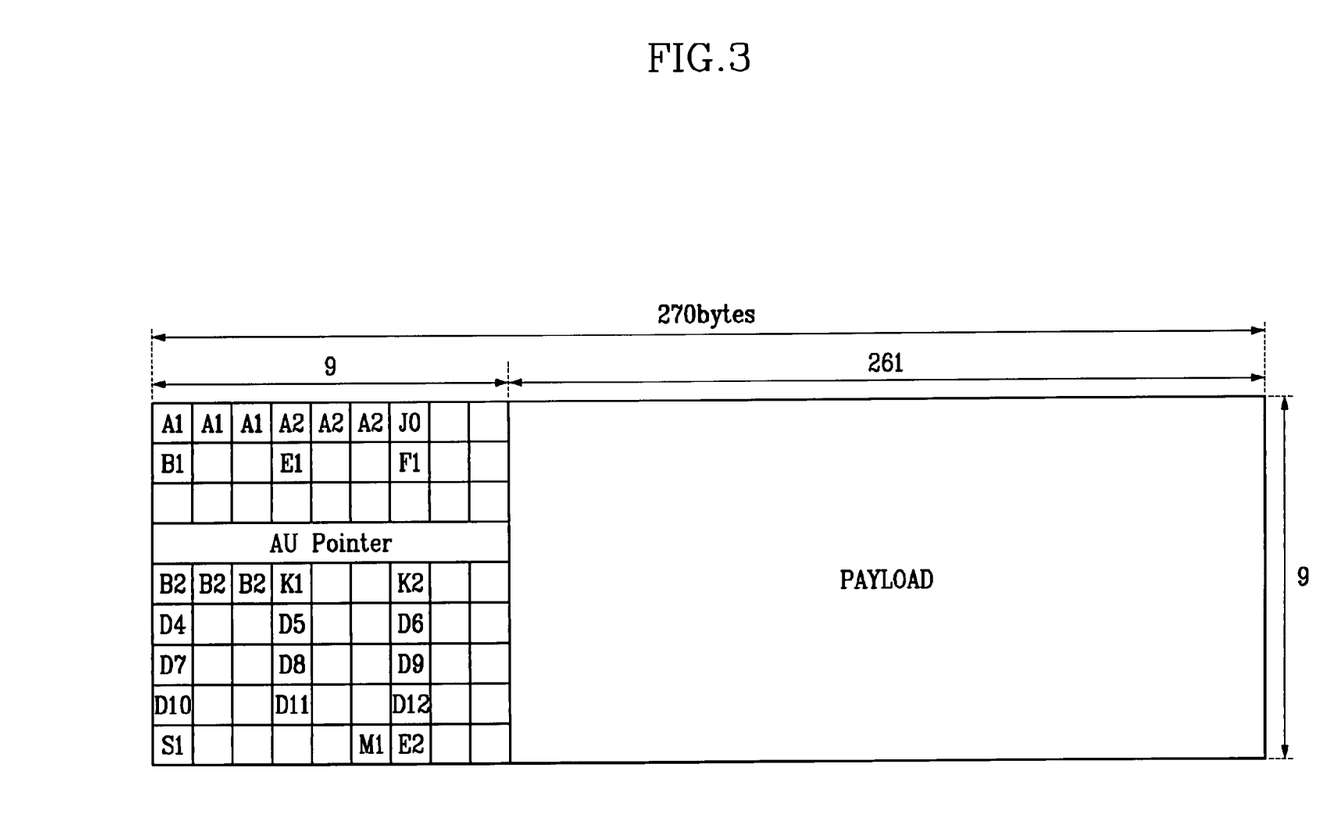
FIG. 3 is a schematic showing the configuration of an optical supervisory channel frame according to an embodiment of the present invention.

FIG. 3 is schematic showing the configuration of an optical supervisory channel frame according to an embodiment of the present invention. The optical supervisory channel frame is generated from the central controller 211 and is transferred to another optical supervisory channel framing device through the respective optical transceivers 201 and 202.

The optical supervisory channel frame according to the embodiment of the present invention includes the STM (Synchronous Transport Module)-1 signal frame recommended in the G.707, but uses only a part of the layer overhead. The optical supervisory channel frame does not use the AU (Administrative Unit) pointer. The payload is not processed in units of VC (Virtual Container)-n (where n=11, 12, 2, 3, or 4), but the whole STM-1 payload is multiplexed or demultiplexed.

The function and usage of each overhead in the optical supervisory channel frame are presented in Table 1.

TABLE 1

| | |
|---|---|
| A1, A2 | Used for frame arrangement byte, follows G.707. |
| J0 | Has trail trace function, uses 16-byte multi-frame and follows G.707. |
| B1 | Used for BIP-8. |
| E1 | For 64-kbit/s engineering orderwise use. |
| F1 | Not used. |
| AU pointer | Not used. |
| B2 | Used for BIP-24. |
| K1, K2 (APS) | Used for protection-switching control channels. |
| K2 (MS-AIS) | Defined as MS-AIS when 6/7/8 bit is "111" and follows G707 |
| D1~D12 | Not used. |
| S1 | Not used. |
| M1 | Used for MS_REI and follows G.707. |
| E2 | Not used. |

The 261-byte payload frame in the optical supervisory channel frame is described below with reference to the accompanying drawing.

FIG. 4 is a diagram of the configuration of the payload frame (optical transport module overhead signal) shown in FIG. 3.

The 261-byte optical supervisory channel payload comprises, as shown in FIG. 4, a signaling control channel SCC, a message communication channel MCC, a protection communication channel PCC, and an automatic laser power control (ALC) channel, as well as overhead signals of optical transmission section OTS, optical multiplex section OMS, and optical channel section OCh.

The payload of this configuration has a frame structure that supports 80 optical channels OCh per band at maximum in consideration of the band range from the C/L-band to the extensible band (L$^+$- or S-band).

More specifically, the signaling channel SCC is a channel for signaling for the control plane of the optical transport network and transporting the related protocols, which channel is necessary for the SCN (Signaling Communication Network) establishment as recommended in the G.7712. The signaling channel SCC is comprised of first to eighteenth strings of the payload (maximum transport rate=10.368 Mbit/s) and is inserted/extracted by an optical multiplex section trail termination OMS_TT.

The message communication channel MCC is used as a message communication channel for a TMN (Telecommunication Message Network) message communication or NMS (Network Management System)/EMS (Element Management System) system and is necessary for MCN (Message Communication Network) establishment as recommended in the G.7712. The message communication channel MCC is comprised of the nineteenth to thirty-sixth strings of the payload (maximum transport rate=10.368 Mbit/s) and is inserted/extracted by an optical transmission section trail termination OTS_TT.

The trail trace identifier TTI is comprised of a 64-byte signal string and is inserted/extracted by the optical transmission section trail termination OTS_TT, as recommended in the G.709.

The automatic laser power control (ALC) channel indicates information, to the downstream optical amplifier, of the input intensity of an optical signal detected from an optical amplifier input. The ALC channel compares the output intensity of the optical amplifier transmitter with the input intensity of the next terminal optical amplifier receiver to measure a loss of optical line, and controls the output of the optical amplifier to be constant. The input intensity of the optical amplifier is converted to a digital value and is transferred as 2-byte data.

The optical multiplex section protection communication channel OMS-PCC or OMS-APS (Automatic Protection Switching) is classified into 2-byte protection-switching control channels PCC for C-, L-, L$^+$-, or S-band for protection-switching of the optical multiplex section.

The optical transport module overhead for payload OTM-OH-P has section-specific overheads so as to perform a monitoring function for the payload of the payload of the optical transport module.

The optical transport module overhead for overhead OTM-OH-O has section-specific overheads so as to perform a monitoring function for the overhead of the optical transport module.

Figure 5:
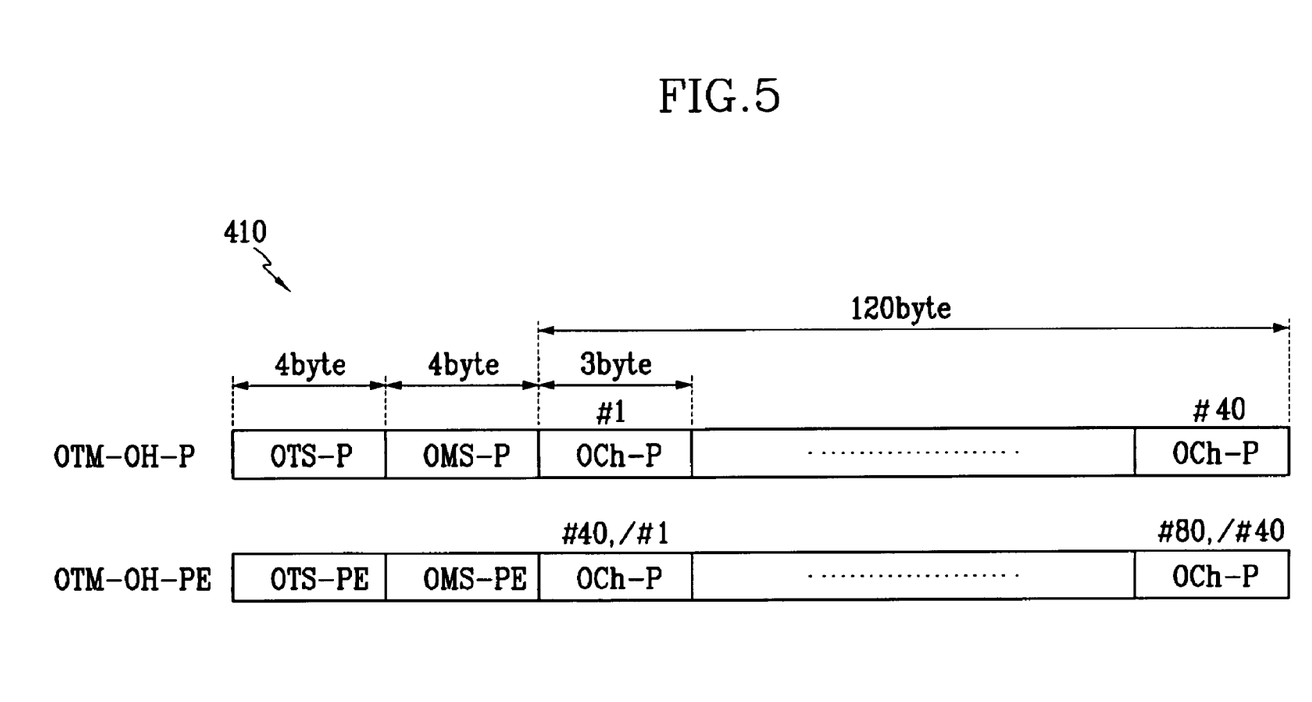
FIG. 5 is a diagram of the configuration of the overhead signal frame 410 for the optical transport module payload as shown in FIG. 4.

FIG. 5 is a diagram showing the configuration of an overhead signal frame 410 for the optical transport module payload as shown in FIG. 4.

The overhead signal frame 410 for the optical transport module payload has section-specific overheads so as to perform a monitoring function for the payload of the optical transport module. The central controller 211 allocates, as illustrated in FIG. 5, each 4 bytes to the optical transmission section overhead for payload OTS-OH-P and the optical multiplex section overhead for payload OMS-OH-P, and 3 bytes to the optical channel section overhead for payload OCh-OH-P.

The method for using the optical transport module overhead for payload is described as follows.

(1) The central controller 211 multiplexes less than 40 optical channels in a same wavelength band, and uses OTM-OH-P other than OTM-OH-PE for optical multiplexing with a single optical multiplexer and a single optical amplifier.

(2) The central controller 211 divides 80-channel optical signals in a same wavelength band into two 40-channel groups, and uses both OTM-OH-P and OTM-OH-PE (including OTS-PE and OMS-PE) when managing the two groups as the optical transmission section and the optical multiplex section with an optical multiplexer and an optical amplifier.

(3) The central controller 211 divides 80-channel optical signals in a same wavelength band into two 40-channel groups for optical multiplexing, and uses OTM-OH-PE and OTM-OH-P other than OTS-PE when managing the optical multiplex section by the groups with a single optical amplifier.

(4) The central controller 211 uses OTM-OH-PE and OTM-OH-P other than OTS-PE and OMS-PE when managing 80-channel optical signals with a single optical multiplexer and a single optical amplifier.

Figure 6:
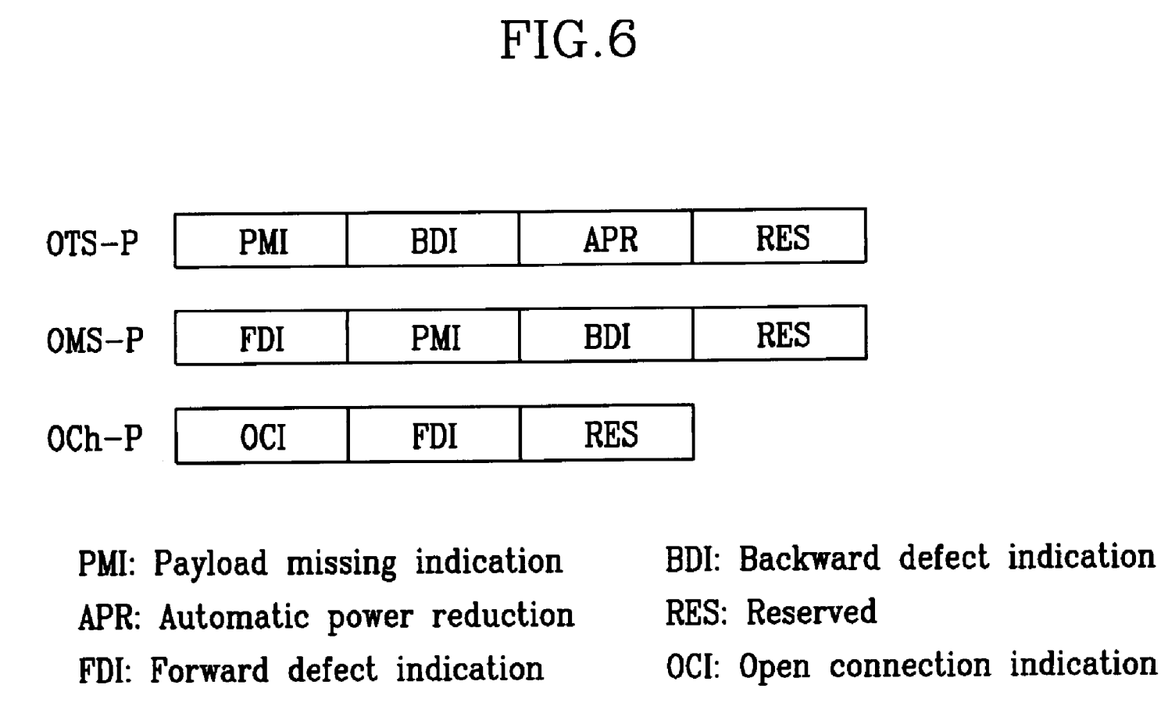
FIG. 6 shows information allocation of the section-specific payload frame shown in FIG. 5.

The information allocation of OTS-P, OMS-P, and OCh-P of the optical transport module overhead for payload OTM-OH-P is illustrated in FIG. 6.

The OTS-P includes a 1-byte OTS-PMI (Optical transmission section—Payload Missing Indication), a 1-byte OTS-BDI-P (Optical transmission section—Backward Defect Indication for Payload), a 1-byte APR (Automatic Power Reduction), and one extra byte. The APR interrupts the optical output signal of the next optical amplifier when there is no input signal to the optical amplifier.

The OMS-P includes a 1-byte OMS-FDI-P (Optical Multiplex Section—Forward Defect Indication for Payload), a 1-byte OMS-PMI, a 1-byte OMS-BDI-P, and one extra byte. The OCh-P includes a 1-byte OCI (Open Connection Indication), a 1-byte OCh-FDI-P (Optical Channel—Forward Defect Indication for Payload), and one extra byte.

Figure 7:
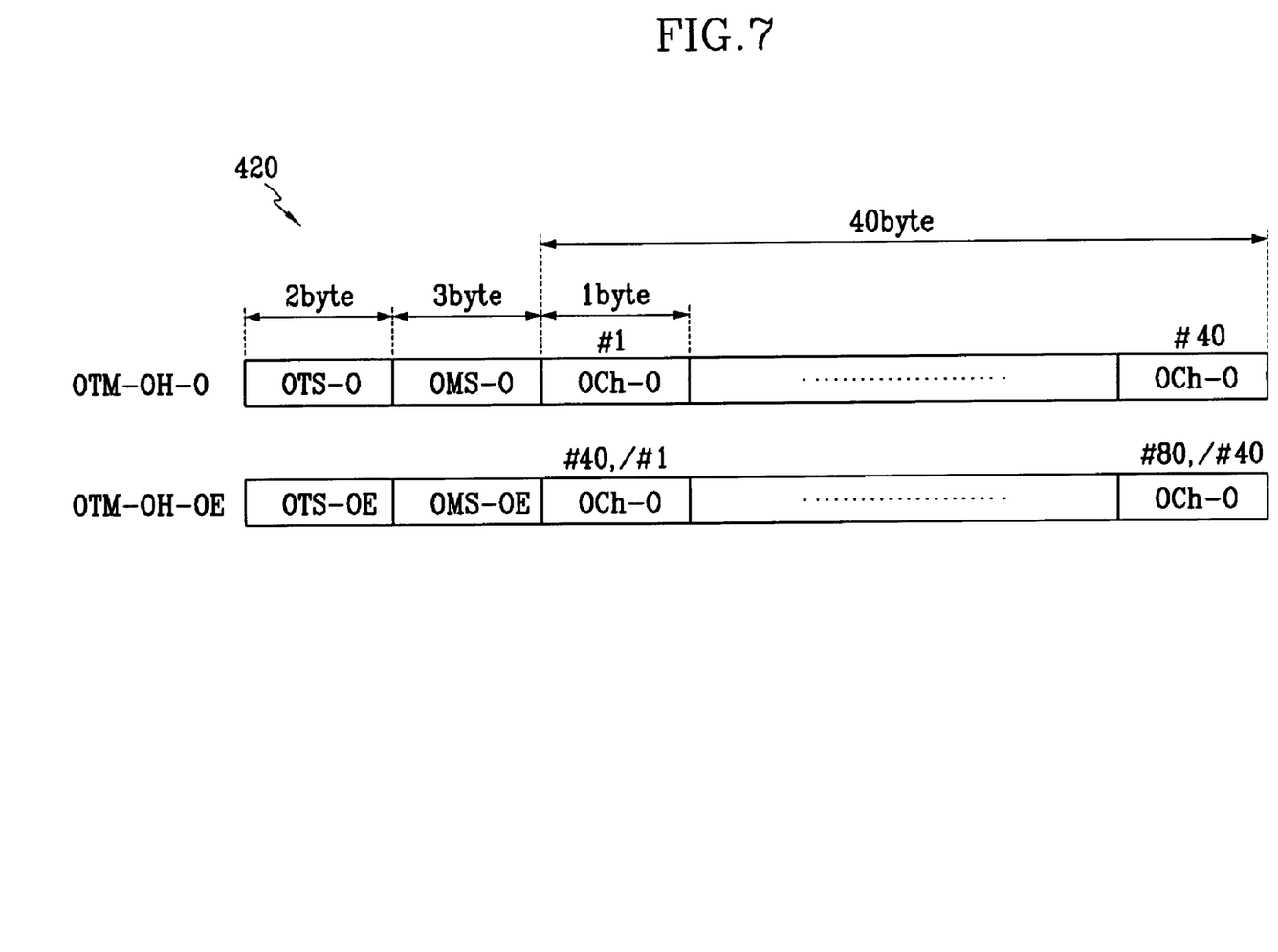
FIG. 7 shows the configuration of the overhead signal frame 420 for the optical transport module overhead as shown in FIG. 4.

FIG. 7 shows the configuration of an overhead signal frame 420 for the optical transport module overhead as shown in FIG. 4.

The overhead signal frame 420 for the optical transport module overhead has section-specific overheads for monitoring the overheads of the optical transport module and includes, as illustrated in FIG. 7, a 2-byte optical transport module overhead for overhead OTS-OH-O, a 3-byte optical multiplex module overhead for overhead OMS-OH-O, and an 1-byte optical channel module overhead for overhead OCh-OH-O.

The case (method) of using the overhead signal frame 420 for optical transport module overhead is the same as that of the previously described optical transport module overhead for payload OTM-OH-P.

Figure 8:
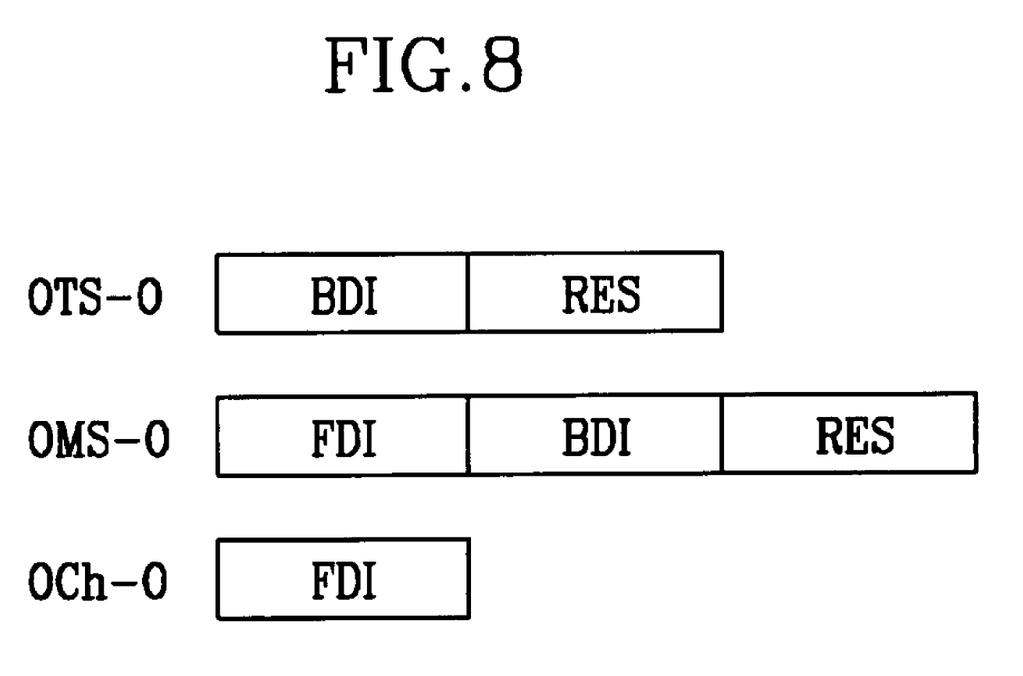
FIG. 8 shows information allocation of the section-specific payload frame shown in FIG. 7.

The information allocation of the optical transmission section overhead OTS-O, the optical multiplex section overhead OMS-O, and the optical channel section overhead OCh-O of the signal frame 420 is illustrated in FIG. 8.

Referring to FIG. 8, the optical transmission section overhead OTS-O includes a 1-byte OTS-BDI-O and one extra byte, and the optical multiplex section overhead OMS-O includes a 1-byte OMS-FDI-O, a 1-byte OMS-BDI-O, and one extra byte. The optical channel section overhead OCh-O includes a 1-byte OCh-FDI-O.

Figure 9:
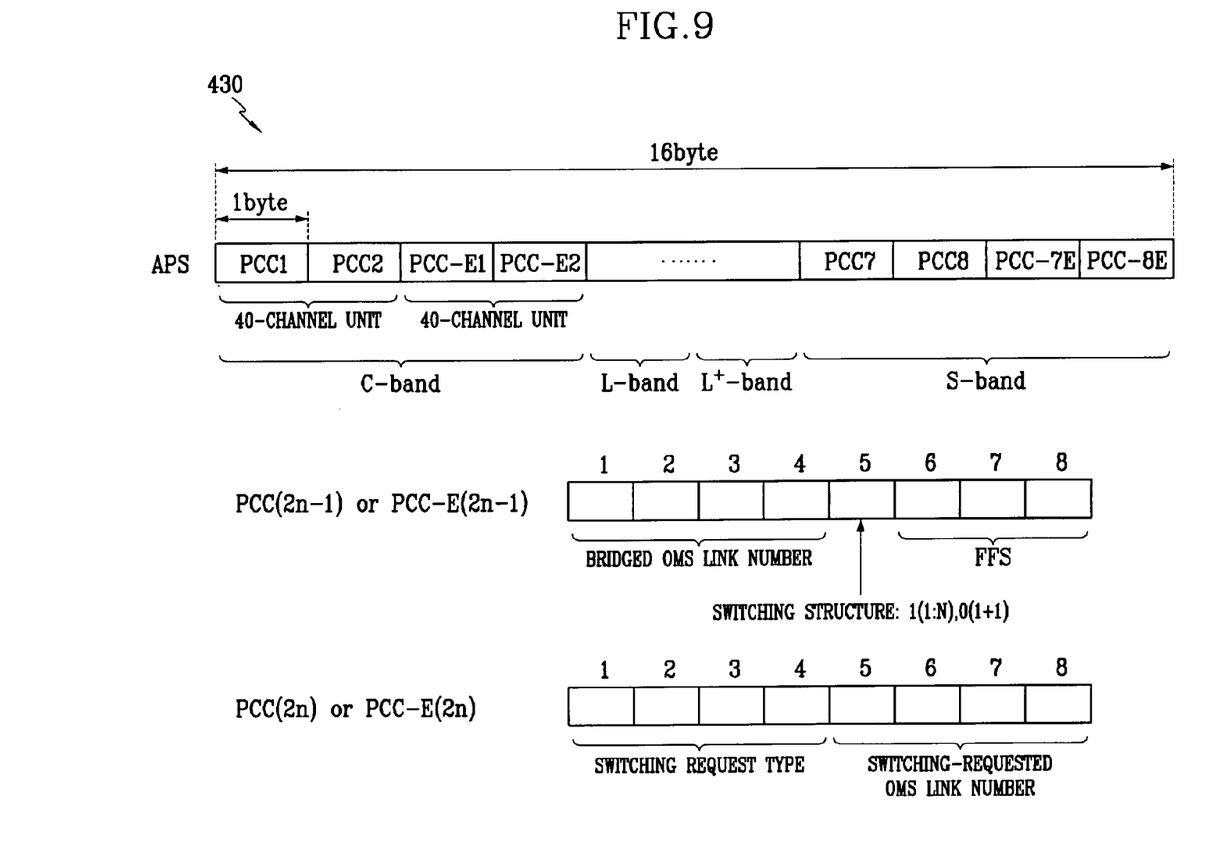
FIG. 9 shows the configuration of the protection-switching control channel frame 430 shown in FIG. 4.

FIG. 9 shows the configuration of the protection control channel frame shown in FIG. 4.

The protection-switching control channel PCC is comprised of at most 8 independent control channels for protection-switching of the optical multiplex section. The central controller 211 allocates a 2-byte protection-switching control channel PCCn and a 2-byte extensible PCCn-E for C-, L-, L+-, or S-band.

Referring to FIG. 9, PCC1/PCC2 is allocated to the C-band, PCC3/PCC4 to the L-band, PCC5/PCC6 to the L+-band, and PCC7/PCC8 to the S-band. The protection-switching control channel PCCn has a K1/K2 byte structure as recommended in the G.707.

Namely, the PCC(2n−1)-th and PCC2n-th bytes are bit-allocated as K2 and K1, respectively, as recommended in the G.707.

The first to fourth bits of the PCC(2n−1) byte are allocated to define the link number of the optical multiplex section bridged to the transmitter, and the fifth bit defines the structure of the switching system, i.e., the byte for discriminating 1:n or 1+1.

The first to fourth bits of the PCC2 byte are allocated to define the switching request type (automatic,. manual, forced switching, etc.) of the receiver, and the fifth to eighth bits define the link number of the optical multiplex section requesting the switching. The information allocation for protection switching, the control processing order, and the protocol processing follow the recommendations of the G.841.

In this manner, the central controller 211 uses the 16-byte protection-switching control channel PCC for optical multiplexing protection-switching, but the protection-switching control channel PCC has the conventional K1/K2 (2-byte) byte structure.

As described above, the device and method for optical supervisory channel framing in an optical transport network system according to the embodiment of the present invention not only rapidly transports LOS prevention signals for preventing an occurrence of another problem after a first problem in the respective sections (optical transmission section/optical multiplex section/optical channel section) to the respective sections through the section-specific maintenance transceivers, but also processes all the LOS signals according to the occurrence of the section-specific problem by a single maintenance signal generator. maintenance signal generator.

In addition, the device and method for optical supervisory channel framing in an optical transport network system transfers optical supervisory channel frames, generated by multiplexing the section-specific maintenance signals and the related channels, to another device (i.e., another repeater, or the terminal system) through a single optical supervisory channel (1510 nm or 1640 nm), so as to prevent the dissipation of separate hardware equipment and resources.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The device and method for optical supervisory channel framing in an optical transport network system according to the embodiment of the present invention processes all the LOS signals according to the occurrence of problems in the respective sections (optical transmission section/optical multiplex section/optical channel section) with a single maintenance signal generator, and rapidly transfers the LOS prevention signals for preventing an occurrence of another problem after a first problem to the respective sections through the section-specific maintenance transceivers.

Furthermore, the present invention transfers optical supervisory channel frames, generated by multiplexing the section-specific maintenance signals and the related channels, to another device (i.e., another repeater, or the terminal system) through a single optical supervisory channel (1510 nm or 1640 nm) to prevent the dissipation of separate hardware equipment and resources.

What is claimed is:

1. A device for optical supervisory channel framing in an optical transport network system, which includes at least one of an optical transmission section, an optical multiplex section, and an optical channel section, the device comprising:

a maintenance signal generator for generating a maintenance signal according to an LOS (Loss Of Signal) signal generated from the at least one section, and generating an LOS prevention signal for preventing an occurrence of another problem after a first problem by sections according to the LOS signal and an optical supervisory channel frame including an externally received maintenance signal;

a maintenance transceiver for transferring the LOS prevention signal to the at least one section, or the LOS signal to the maintenance signal generator; and a central controller for multiplexing the maintenance signal and a frame-related channel including a message communication channel to generate an optical supervisory channel frame, and transmitting the generated optical supervisory channel frame to another device including a repeater and a terminal system through a single optical supervisory channel, wherein the maintenance transceiver comprises:

an optical transmission section maintenance transceiver for receiving the LOS signal from the optical transmission section, transmitting the received LOS signal to the maintenance signal generator, and transferring the LOS prevention signal received from the maintenance signal generator to the optical transmission section;

an optical multiplex section maintenance transceiver for receiving the LOS signal from the optical multiplex section, transmitting the received LOS signal to the maintenance signal generator, and transferring the LOS prevention signal received from the maintenance signal generator to the optical multiplex section; and an optical channel section maintenance transmitter for transferring the LOS prevention signal received from the maintenance signal generator to the optical channel section.

2. The device as claimed in claim 1, further comprising:

an optical transceiver for converting the externally received optical supervisory channel frame to an electrical signal; and an optical supervisory channel framing supervisor/controller for analyzing the electrical signal to detect an occurrence of a problem including a line fault, and generating an LOS signal upon the detection of a problem.

3. The device as claimed in claim 2, wherein the optical supervisory channel framing supervisor/controller uses the LOS prevention signal to prevent an occurrence of another problem after a first problem of the optical transceiver.

4. The device as claimed in claim 1, wherein the maintenance signal generator analyzes the externally received optical supervisory channel frame to detect the occurrence and cause of a problem of the optical channel section, and generates the LOS prevention signal based on the analysis result.

5. The device as claimed in claim 2, wherein the generated optical supervisory channel frame includes an overhead of the optical supervisory channel frame received from the optical supervisory channel framing supervisor/controller.

6. A method for optical supervisory channel framing in an optical transport network system, which includes at least one of an optical transmission section, an optical multiplex section, and an optical channel section, the method comprising:

(a) generating a maintenance signal according to an LOS signal generated from the at least one section;

(b) generating an LOS prevention signal for preventing an occurrence of another problem after a first problem by sections according to the LOS signal and an optical supervisory channel frame including an externally received maintenance signal;

(c) transferring the LOS prevention signal to any one section;

(d) multiplexing the maintenance signal and a frame-related channel including a message communication channel to generate an optical supervisory channel frame; and (e) transmitting the generated optical supervisory channel frame to another device including a repeater and a terminal system through a single optical supervisory channel, (f) analyzing the externally received optical supervisory channel frame to detect an occurrence of a problem including a line fault, and generating an LOS signal upon the detection of a problem; and (g) extracting an overhead of the externally received optical supervisory channel frame, and inserting the extracted overhead in the optical supervisory channel frame, wherein the step (c) comprises:

receiving the LOS signal from the optical transmission section, transmitting the received LOS signal, and transferring the generated LOS prevention signal to the optical transmission section;

receiving the LOS signal from the optical multiplex section, transmitting the received LOS signal, and transferring the generated LOS prevention signal to the optical multiplex-section; and transferring the generated LOS prevention signal to the optical channel section.

7. The method as claimed in claim 6, wherein the step (b) comprises:

analyzing the externally received optical supervisory channel frame to detect the occurrence and cause of a problem of the optical channel section; and generating the LOS prevention signal based on the analysis result.

* * * * *